United States Patent [19]

Sato

[11] Patent Number: 5,177,624
[45] Date of Patent: Jan. 5, 1993

[54] IMAGE READING APPARATUS

[75] Inventor: Tatsuru Sato, Tokyo, Japan

[73] Assignee: Sony Corporation, Tokyo, Japan

[21] Appl. No.: 514,957

[22] Filed: Apr. 26, 1990

[30] Foreign Application Priority Data

May 2, 1989 [JP] Japan .................................. 1-113451
May 2, 1989 [JP] Japan .................................. 1-113452

[51] Int. Cl.⁵ ............................................ H04N 1/40
[52] U.S. Cl. .................................... 358/462; 358/453;
358/471; 358/22; 340/709
[58] Field of Search ............... 358/470, 471, 448, 452,
358/453, 464, 462, 22, 11, 140; 340/709

[56] References Cited

U.S. PATENT DOCUMENTS

| 4,638,368 | 1/1987 | Shimizu et al. | 358/470 |
| 4,641,197 | 2/1987 | Miyagi | 358/280 |
| 4,642,790 | 2/1987 | Minshull et al. | 340/750 |
| 4,809,215 | 2/1989 | Nakamura et al. | 364/900 |
| 4,813,013 | 3/1989 | Dunn | 364/900 |
| 4,819,063 | 4/1989 | Sugiura | 358/75 |
| 4,827,253 | 5/1989 | Maltz | 340/734 |
| 5,068,645 | 11/1991 | Drumm | 340/709 |

FOREIGN PATENT DOCUMENTS

3625390 A1 2/1987 Fed. Rep. of Germany .
3707490 A1 9/1988 Fed. Rep. of Germany .
2179227 2/1987 United Kingdom .

Primary Examiner—Edward L. Coles, Sr.
Assistant Examiner—Jerome Grant, II
Attorney, Agent, or Firm—Hill, Van Santen, Steadman & Simpson

[57] ABSTRACT

According to a first feature of the present invention, an image reading apparatus is disclosed in which image data read from an image document by an imaging reading device are called into an image memory. An output signal from a character generator for generating a character in the form of an indicator is superimposed on the image data to provide a display signal. Any desired portion of the image data displayed on a display device is indicated by the character in the form of the indicator, that is a so-called pointer. According to a second feature, the display position of the character is moved in synchronism with shifting of the data reading region from the image memory or so-called scrolling to prevent the character display position from being deviated with respect to the contents of the displayed image.

6 Claims, 5 Drawing Sheets

IMAGE READING APPARATUS

BACKGROUND OF THE INVENTION

1. Field of the Invention

This invention relates to an image reading or scanning apparatus in which image data read by image reading means are displayed on display means such as a cathode ray tube (CRT).

2. Prior Art

As a conventional image reading apparatus, there is known a scanning apparatus whereby digital image data produced upon reading an image document by an image sensor such as a CCD are output by way of a digital interface, such as a GPIB. For outputting the read image in a visible form, such as by printing or a monitor display, it is necessary to provide a computer in the system, thereby increasing the overall system scale. On the other hand, response properties are rather poor because of time-consuming signal processing operations. For this reason, the image reading apparatus, such as the conventional scanner, is not suited to be used for presentation purposes in an exhibition fair or lecture meeting.

In a copending patent application, filed in the name of the present Assignee, there is proposed an image reading apparatus in which an image document is read for storage in an image memory and the stored contents are repeatedly read from the image memory in synchronism with horizontal and vertical scanning signals of video signals so as to be output as video signals for displaying a still image.

Meanwhile, on the occasion of presentations, for example, it is frequently desired that an oral illustration or the like be made while attention is directed to desired portions of the displayed image. However, since verbal explanation is insufficient to make an accurate indication of the desired portion, it has been desired to evolve an image reading apparatus capable of making visual indications of the desired image portions in some form or other.

Figure 6A:
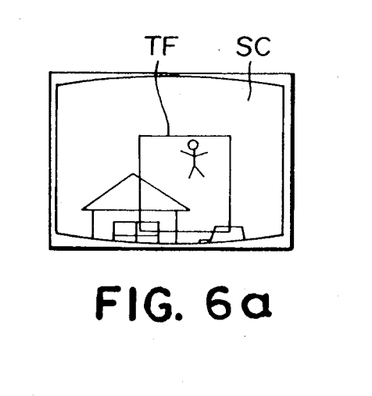
Figure 6B:
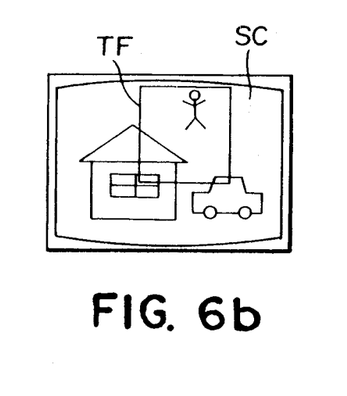
Figure 7:
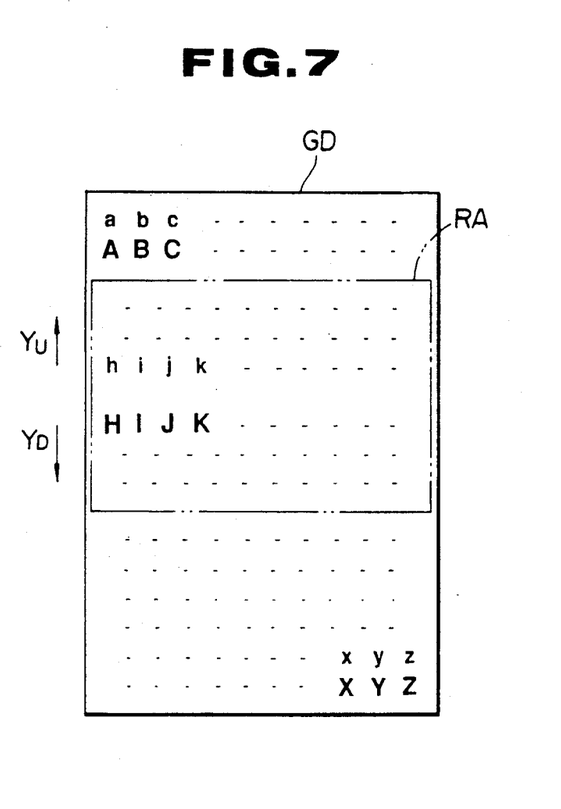
FIG. 7 is a diagrammatic plan view for illustrating the movement of the reading region with respect to image data stored in a memory.
Figure 8:
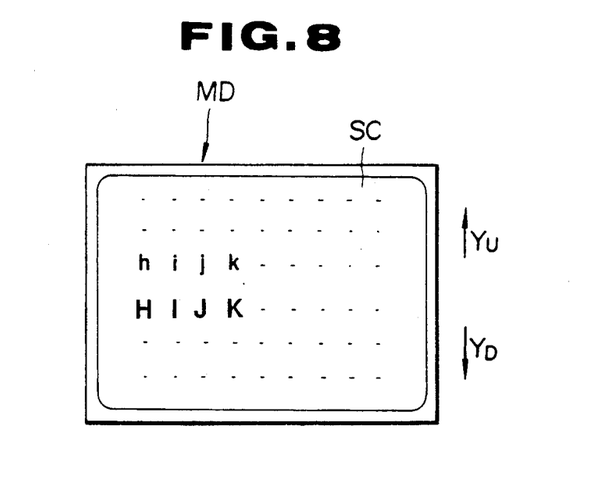
FIG. 8 is a diagrammatic plan view showing an example of a display on the display screen.

On the other hand, in the image reading apparatus adapted for directly outputting video signals, it has been envisaged to set the capacity of the image memory so as to be larger than the display range and to shift the reading region from the image memory by way of a so-called scroll display. The scroll display is such a display in which a memory reading region RA corresponding to the display range on a display screen SC of a monitor receiver MD of FIG. 8 is moved vertically for vertically shifting the contents of the image displayed on the display screen SC of the monitor receiver MD, as shown in FIG. 7. In such case, if the memory reading region RA is moved in an upward direction Yu with respect to the image document GD stored in the image memory, the contents of the displayed image on the display screen SC of FIG. 6 are moved in a downward direction $Y_D$ by way of a scrolling down operation.

Assuming that the pointer marks, such as arrows, are displayed for indicating desired portions of the image, and that, to this end, the above mentioned pointer mark display signals are generated by a character generator or the like and superimposed as output display signals on image data read from the image memory, if only the display contents of the image read from the image memory are scrolled, the portion indicated by the pointer mark is undesirably shifted with respect to the contents of the displayed image. It is also not desirable that characters having positional pertinence to the image contents, such as trimming frames, be deviated from the correct relative position at the time of scrolling.

OBJECT AND SUMMARY OF THE INVENTION

It is a primary object of the present invention to provide an image reading apparatus whereby desired portions of the contents of the displayed image may be displayed visually easily and accurately.

It is a second object of the present invention to provide an image reading apparatus in which in case of a scroll display of image contents, the relative position of the characters having positional pertinence to the image contents, such as pointer marks, is not deviated from the image contents.

Figure 1:
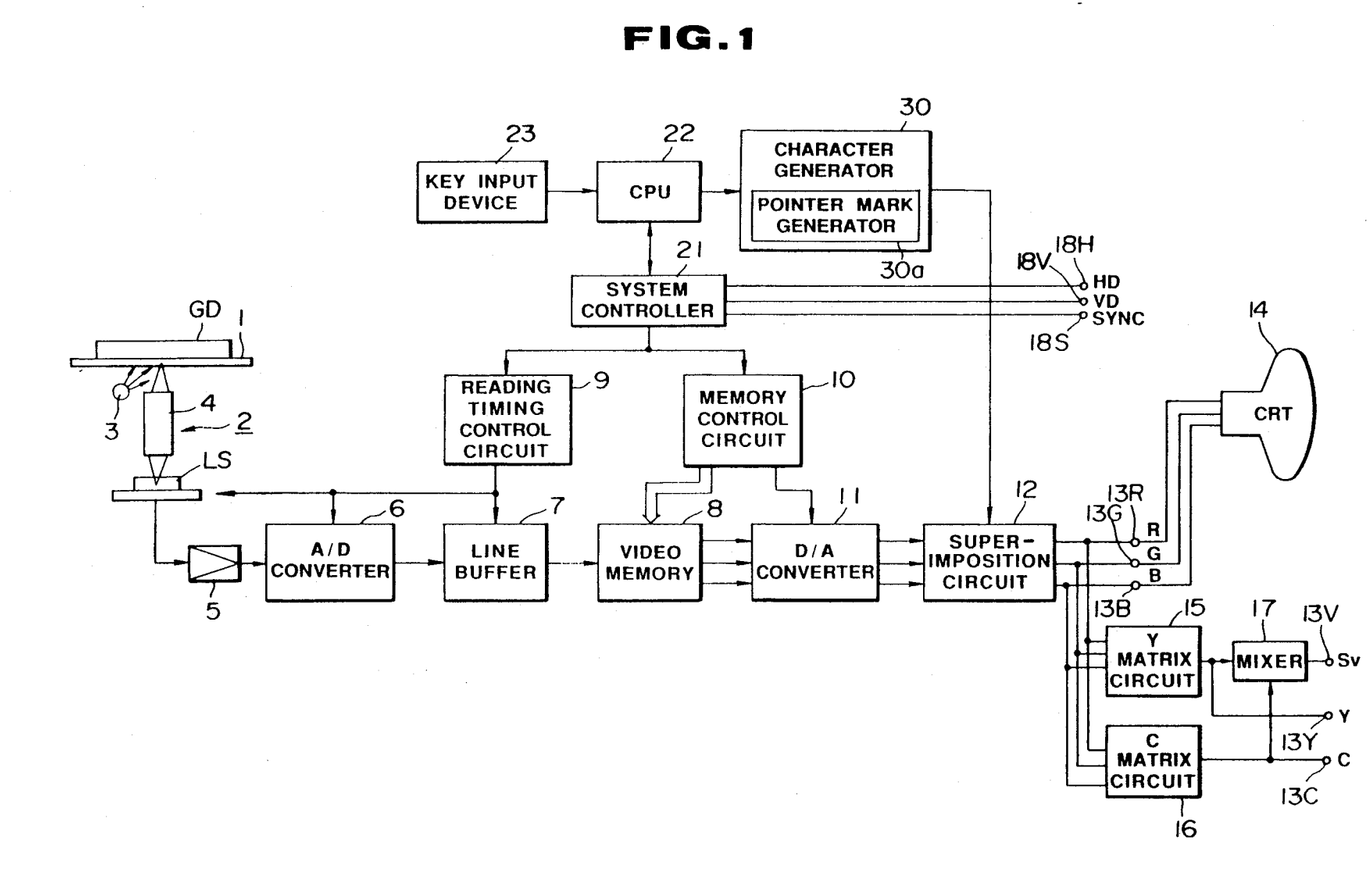
FIG. 1 is a block diagram showing an image reading apparatus embodying the present invention.

In a first aspect of the present invention, there is provided an image reading apparatus comprising, as shown in FIG. 1, an image reading head 2 as an image reading means, an image memory 8 for calling the image data read by the image reading head 2 as an image reading means, and character generating means 30 for generating characters having the shape of indicators pointing to desired portions on the image, such as the shape of an arrow or an index finger, wherein character signals output from character generator means 30 are superimposed on image data read from the image memory 8.

Thus the character display signals for the character in the form of indicators from the character generating means 30 are superimposed as display signals on image data read from the image memory 8, in which image data read from the reading head 2 are stored, whereby the characters in the form of indicators may be displayed at desired portions on the display screen for visually pointing to the desired portions of the display screen.

In a second aspect, the present invention provides an image reading apparatus which includes character generating means for outputting character display signals, such as indicators or trimming frames. The image data reading region stored in the image memory 8 is moved by a CPU 22, system control circuit 21 and a memory control circuit 10 so as to perform a scroll display. The character display signals output from the character generating means are superimposed by a superimposition circuit 12 as display signals on the image data read from the image memory 8. The display position of the character display signals from the character generating means is moved in a controlled manner in dependence upon the movement of the image data reading region for scroll display for bringing the character display position into coincidence with the displayed image.

In this manner, when performing a scroll display by shifting the reading range of image data stored in the image memory 8, the display position of character display signals from the character generator 30 is shifted in dependence upon the shifting of the reading range for bringing the character display position into coincidence with the displayed image to prevent deviation of the positional association between the displayed image and the characters during scrolling.

With the image reading apparatus according to the aspect of the present invention, any desired portion of the image displayed on the display screen may be pointed out by displaying a character having the shape of an indicator, that is a pointer mark, at the desired portion of the display screen.

The pointer mark may be moved or changed in display hue or shape by movement of a switch, mouse or a joystick. For example, a pointer mark matched to the contents of the illustration may be displayed for highly effective visual expression or presentation.

With the image reading apparatus according to the second feature of the present invention, when the reading region of image data stored in the image memory is shifted for scrolling the contents of the displayed image, a display position of the character display signals having positional pertinence to the contents of the displayed image, such as characters, above all the pointer marks or trimming frames, from character generating means, is shifted for bringing the character display position into coincidence with the displayed image. Thus a deviation in the relative position of the character to the displayed image contents may be prevented as a result of scrolling.

The above and other objects of the present invention will become apparent from the following description.

BRIEF DESCRIPTION OF THE DRAWINGS

FIGS. 5(a-c) and 6(a and b) are diagrammatic front views for illustrating the scrolling operation of the image contents displayed on the display screen and specific examples of the characters operatively associated with such a scrolling operation.

DETAILED DESCRIPTION OF THE EMBODIMENT

In FIG. 1 there is shown by a block diagram an embodiment of an image reading apparatus according to the present invention.

With the image reading apparatus shown in FIG. 1, an image reading head 2 for reading an image document GD resting on a document table 1 is provided with a light source 3, a multiple lens array 4 and a CCD line sensor LS. The light source 3 irradiates the image document GD and the light reflected from the document GD is received by the line sensor LS via lens array 4. This line sensor LS is formed of a linear array of, for example, 1728 CCD light receiving cells. When reading one line of the image document GD, the light source 2 sequentially emits colored light rays corresponding to three prime colors red (R), green (G) and blue (B) to produce three prime color image signals in a line sequential manner. The output from line sensor LS of the image head 2 is amplified by an amplifier 5 and is transmitted to an A/D converter 6 where it is converted into digital video data which is then stored in a video memory 8, such as a random access memory (SRAM) or dual port memory, after timing matching by a line buffer 7, such as by the FIFO method. The operation of the line sensor LS, A/D converter 6 and the line buffer 7 is controlled by timing control signals from a reading timing control circuit 9, while the writing/reading of the video memory 8 is controlled by control signals from a memory control circuit 10.

The prime color video data corresponding to three prime colors R, G and B are read from video memory 8 and are transmitted to a D/A converter 11 where they are converted into analog R, G and B video signals, which are then transmitted to a superimposition circuit 12. To this superimposition circuit 12 are supplied character display signals from a character generator 30. These character display signals are output after superimposition on the video signals read from the video memory. In general, the character generator 30 outputs character pattern display signals, such as character patterns, numeral patterns or trimming frames. With the present embodiment, the character generator 30 generates display signals for characters having at least the shape of indicators or pointer marks indicating desired portions on the display screen. This generator is shown for example as a pointer mark generating section 30a.

The R, G and B video signals output from the superimposition circuit 12 after superimposition of the character display signals are output at output terminals 13R, 13G, 13B so as to be transmitted to a display apparatus such as a color cathode ray tube monitor (CRT monitor) 14. The R, G and B signals from the superimposition circuit 12 are transmitted to a luminance (Y) matrix circuit 15 and a chrominance (C) matrix circuit 16, and the Y and C signals from these matrix circuit 15 and 16 are output at output terminals 13Y, 13C, respectively. These Y and C signals are mixed in a mixer 17 to produce so-called composite video signals $S_V$ which are then output at output terminal 13V.

The reading timing control circuit 9 and the memory control circuit 10 are controlled by a system controller 21 which sends or receives data or control signals between it and a CPU 22. The system controller 21 and the CPU 22 may be of a unified structure.

A key input device 23 is adapted to supply to CPU 22 key input signals which produce or shift the above mentioned pointer marks, change the display color or pattern configuration of the pointer marks, scroll the contents of the displayed image or determine the image reading range.

The video image 8 has a memory capacity broader than the display range on the CRT monitor 14 and is adapted to shift the data reading range for display RA in the direction of arrows $Y_U$, $Y_D$ with respect to the video document GD stored in the memory 8, as shown for example in FIG. 7, by way of performing a so-called scrolling display in which the contents of the displayed image are moved in the directions of arrows $Y_D$, $Y_U$ on the display screen SC of a monitor receiver MD or CRT monitor 14 shown in FIG. 8. When the display data reading region RA shown in FIG. 7 is moved upwards or in the direction shown by an arrow $Y_U$, display contents on the display screen SC of FIG. 8 are moved down in the direction shown by an arrow $Y_U$ (scroll down operation). This scroll display is achieved in such a fashion that the operation of a scroll up/down key provided in the key input device 23 is sensed by the CPU 22, and the CPU 22 as well as the system controller 21 control the memory control circuit 10 to shift the data reading region RA of the video memory 8.

The CPU 22 controls the character generator 30 responsive to key inputs for pointer display or trimming frame display so that the pointer marks or the trimming frames for displaying the image reading range are provided by one or more character patterns, with the character display signals from the character generator 30 being transmitted to the superimposition circuit 12 for superimposition on the video signals. After the trimming frame is displayed in this manner on the screen of the CRT monitor 14 and its size or position is determined, a trimming key of the key input device 23 is actuated. The CPU 22 and the system controller 21 then control the reading timing control circuit 9 for rereading the image reading range within the image document determined in the above determined manner, that is the range of the display screen corresponding to the trimming frame. The character generator or CRT controller 30 is adapted to display various functions associated with various operations of the image reading apparatus, and is provided with a character pattern ROM in which patterns of alphabetical letters, numerals or symbols are stored. As part of these characters, there are provided patterns for displaying pointer marks or trimming frames.

The system controller 21 outputs a horizontal sync signal HD, a vertical sync signal VD and a composite sync signal SYNC which is a mixture of the signals HD and VD, at output terminals 18H, 18V and 18S, respectively.

With the present embodiment, character patterns constituting the pointer marks may be previously written in, for example, a character ROM in the pointer mark generator 30a, in addition to the character patterns in general, such as the above mentioned alphabetical letters or numerals. These character patterns constituting the pointer marks may be read to constitute the pointer marks which may then be displayed on the screen for pointing to desired portions in the video data.

Figure 3:
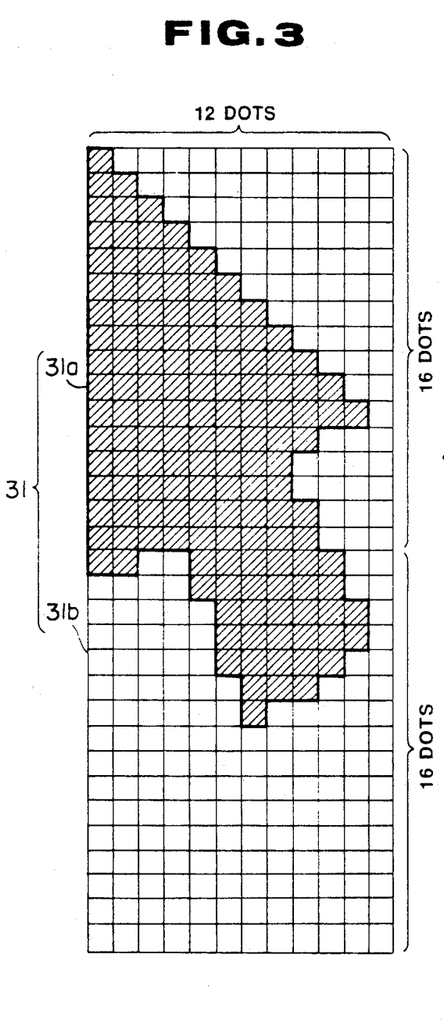
FIGS. 3 and 4 are diagrammatic plan views showing an example of a construction of the pointer mark by character patterns.
Figure 4:
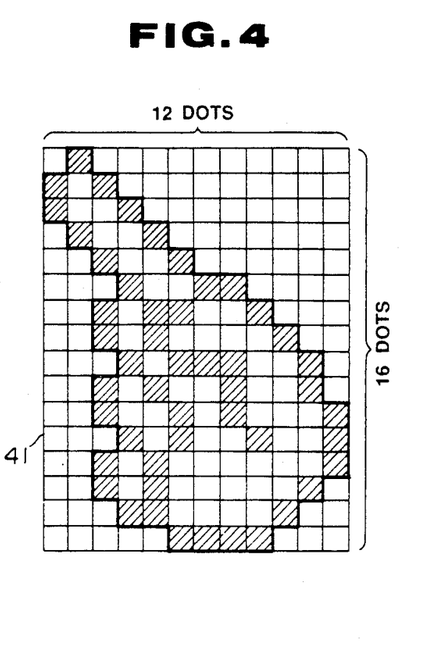

FIGS. 3 and 4 illustrate specific examples of the contour of the pointer marks.

FIG. 3 shows a pointer mark 31 in the form of an arrow which is formed by a character pattern 31a forming an upper portion of the arrow and another character pattern 32a forming a lower portion of the arrow. FIG. 4 shows a pointer mark in the form of a patterned finger of a hand which is formed by a single character pattern.

Figure 2:
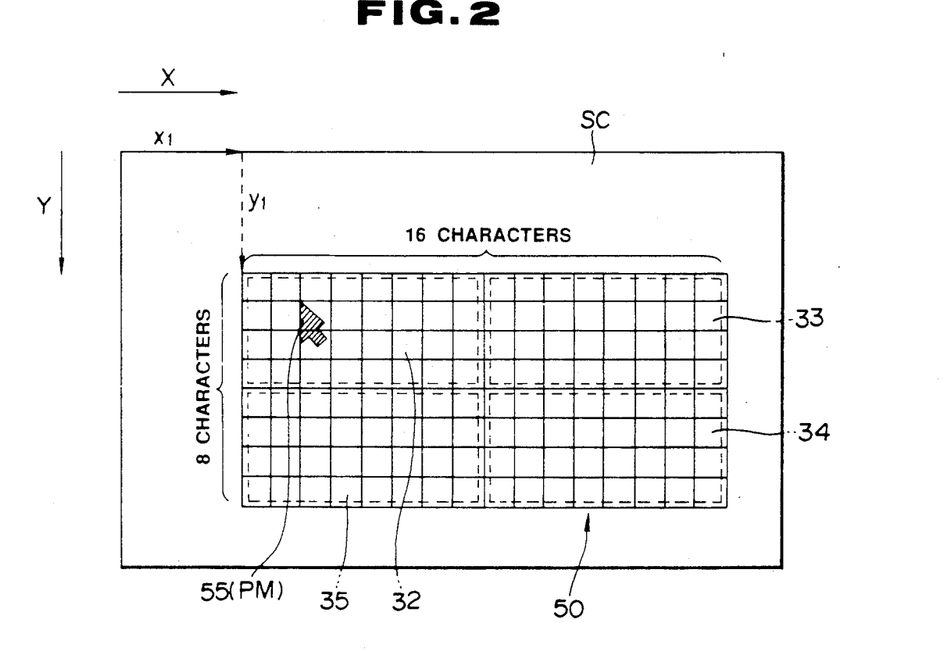
FIG. 2 is a diagrammatic front view showing a specific example of the display table and the pointer mark on the display screen.

Such a pointer mark is displayed on a character display table 50 shown in FIG. 2.

When the signals for pointer mark display are displayed in superimposition on the display screen, the 128-character display table 50 formed by 16 characters in the horizontal direction and 8 characters in the vertical direction is displayed at a predetermined position on the display screen SC. Display of various functions of the image reading apparatus is usually performed by sequentially arraying character patterns, such as alphabetical letters or numerals, on the character display table 50. The pointer mark may be displayed in a similar manner in desired allocated positions on the display table 50 on the display screen SC.

Supposing that the portion desired to be pointed is at the upper left side of the display screen SC, it suffices to display the pointer mark 55 at the upper left allocated position of the display table 50. The desired portion in the displayed image may be pointed to with a position display accuracy of the order of one character.

By displaying the pointer mark at the desired position on the display table 50 allocated for display, desired portions in the displayed image may be pointed to freely with positional accuracy of the order of one character. The pointer mark movement may also be made by shifting the position of the display table 50 on the display screen SC.

If the display position of the display table 50 on the display screen SC of FIG. 2, such as X and Y coordinates ($x_1$, $y_1$) at the upper left end, can be changed by the pointer mark generator 30a, the position of the display table 50 on the display screen SC can be changed to shift the pointer mark displayed on the display table 50. Hence, by shifting the pointer mark within the display table 50 on the order of one character and further shifting the display table 50, the desired portion in the displayed image may be pointed with a higher resolution. Such change in the display position of the display table 50 itself may be realized by controlling the readout timing of the display table 50 with respect to the horizontal and vertical sync signals.

With the present embodiment, each character pattern is formed by 12 horizontal dots and 16 vertical dots, and the character display table 50 is formed by 16 horizontal characters or 192 dots and 8 vertical characters or 256 dots. Each dot of the character pattern is read in the horizontal direction at a 5 kHz clock, while each dot of the character pattern along the vertical direction corresponds to each scanning line of the display screen SC of the CRT monitor 14. Thus the display screen SC in its entirety is formed by 250 horizontal dots (5 kHz clocks per hour) and 480 vertical dots, with the effective display surface being formed by 480 lines. The $192 \times 256$ dot display table 50 is movably displayed within the display screen SC.

The pointer mark 31 in the form of an arrow shown in FIG. 3 and the pointer mark 41 in the form of a finger of a hand shown in FIG. 4 may be switched as to contour or display hue by a switch, mouse or joystick of the key input device 23. For example, if the pointer mark 31 shown in FIG. 3 is first displayed in a black hue, the display is switched from black in the sequence of red, green, yellow, blue, magenta, cyan and white, each time the switch is pressed. When the display hue is switched to white, the pointer 31 is switched to the pointer mark 41 in the form of a finger as shown in FIG. 4. The display hue is similarly changed from black through red, green, yellow, blue, magenta and cyan to white in this sequence to again return to and start at black in a repetitive fashion. Thus the user may select the pointer mark of desired contour and display hue for the pointer mark. The pointer mark may be moved by a switch, mouse or a joystick, or its display color or shape may be changed. For example, the pointer marks may be displayed in accordance with the contents of oral elucidation for visual expression or presentation with improved effects.

The pointer marks previously stored in the character ROM in the pointer mark generator 30a are not limited to the contours of the marks 31 and 41. For example, although these pointer marks 31, 41 point to the upper left, character patterns may also be stored in the character ROM which point to four directions, that is to the upper right, lower right and lower left, in addition to the upper left as described above. Character patterns pointing to eight directions, including upper, lower, left and right in addition to the above mentioned four inclined directions, may also be stored in the character ROM.

As a modification, with the use of the four pointer marks pointing to the above mentioned upper right, lower right, upper left and lower left, the display region of the display table 50 may be divided into four regions 32, 33, 34, 35 as shown in FIG. 2, in such a manner that, when the pointer marks are displayed in these regions, each of the four marks is displayed in that one of the regions to which it is allocated for pointing a desired portion of picture data. For example, the pointer mark pointing to the upper left is displayed in the upper left quadrant region 32, the pointer mark pointing to the upper right is displayed in the upper right quadrant region 33, the pointer mark pointing to the lower right is displayed in the lower right quadrant region 34 and the pointer mark pointing to the lower left is displayed in the lower left quadrant region 35, so that the four corners in the display table 50 can be pointed to unanimously.

The present invention is not limited to the above described embodiments. For example, as the character generating means for generating pointer mark display signals, a pattern generating ROM in which pointer mark patterns are stored may be employed, besides the arrangement of using a general character generator. In this case, the pattern reading timing from the ROM is changed with respect to the horizontal and vertical sync signals to shift the pointer mark display position on the display screen SC. The contour of the pointer mark may also be a triangle or any other contour, besides that of the arrow or index finger. It is to be noted that the types of the display hues of the pointer marks or the switching sequence of the display hues may be changed from those shown in the above illustrative embodiment.

According to a second feature of the present invention, the display position on the display screen of the characters having positional pertinence to the contents of the displayed image, such as the above mentioned pointer marks or trimming frames, is moved concomitantly during the scrolling operation so that the relative position of the displayed character with respect to the contents of the displayed image is not shifted. To this end, the readout region RA from the image memory 8 is shifted by the memory control circuit 10 which is controlled by CPU 22 and system control circuit 21 responsive to a scrolling input from the key input device 23, at the same time that the display position on the screen of character signals from the character generator 30 is moved synchronously.

Figure 5A:
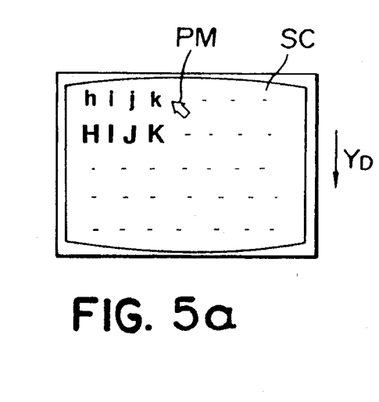
Figure 5B:
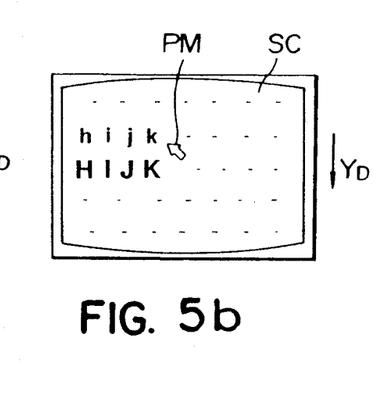
Figure 5C:
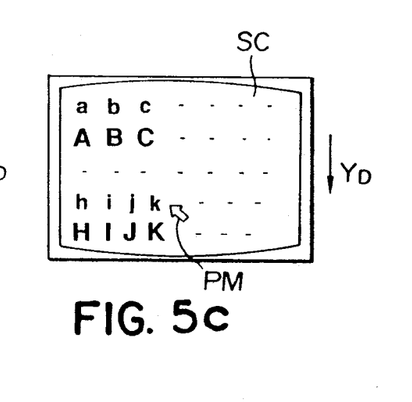

The scrolling operation is performed without the position of the pointer mark PM being deviated with respect to the contents of the image displayed on the screen surface SC, as shown for example at (a), (b) and (c) in FIG. 5, and without the position of the trimming frame TF being deviated with respected to the contents of the image displayed on the screen SC, as shown at (a) and (b) in FIG. 6. The display position of the characters having positional pertinence with respect to the contents of the displayed image, such as the pointer marks or trimming frames, is shifted in timed relation with the scrolling of the displayed image, as described above. The character display position can be shifted stepwise on a character-by-character basis by changing the position allocated for character display within the character display table 50. The readout range delimiting can be shifted by changing the display position of the character display table 50 in the display screen SC. That is to say, if the display position of the character display table 50 on the display screen SC of FIG. 4, such as the X, Y coordinates $(x_1, y_1)$, can be changed by the character generator, the pointer mark PM or the trimming frame displayed in the table 50 can be moved by changing the position of the character display table 50 on the display screen SC.

With the image reading apparatus of the present embodiment, a portion of the image document GD delimited by the trimming frame is re-read by the reading head 2 so as to be displayed to an enlarged scale on the overall surface of the display screen SC. Considering that the number of light receiving cells of the line sensor LS is 1728 and the resolution in the Y- direction or vertical direction of the ordinary CRT monitor screen surface SC is 480 or so, if the full size document of an A4 format is to be displayed in its entirety on the screen surface SC, it suffices to read out the cells at a thinning-out rate of one to four cells. When a $\frac{1}{4}$-size region is to be read and displayed to an enlarged scale, it may be read with sufficient resolution by the same line sensor LS. The merit derived from re-reading the document is apparent on taking into account the deterioration in resolution which is brought about when only a portion of a region of image data read from the document and stored in the image memory is displayed to an enlarged scale.

It is noted that the standard readout range of the image reading apparatus of the present embodiment is the A4 size format with the long side placed along the horizontal direction. When an image document is which writing on made horizontally on a sheet placed with the long side extending vertically is to be displayed horizontally, the upper half of the A4 format document is displayed at the output in its entirety. When an UP key of an UP/DOWN key unit of the key input device is pressed in this condition, the display is scrolled upwardly, as indicated by an arrow $Y_U$, at steps of two lines (2H) each time. In connection with this scrolling function, although the DOWN key in the initial state is not accepted, both the UP and DOWN keys are accepted after start of scrolling.

The illustration of these functions is displayed by the character generator 30 on the screen under control by CPU 22. For example, when trimming is again performed after trimming as described above, "TRIMMING ONCE ONLY" is displayed, indicating that trimming after trimming is not feasible. An error message such as "NO TRIMMING IN SCROLL MODE" indicating that trimming is not feasible during the scroll mode, as well as error messages such as "NO TRIMMING DURING SUPERIMPOSITION", "NO SIZE CHANGING IN SCROLL MODE", "NO SUPERIMPOSING IN SCROLL MODE", "NO COLOR CHANGING FOR TRIMMING FRAME" or "NO TRIMMING AFTER READING MINIMUM SIZE DOCUMENT" are displayed. The readout size, such as "SIZE n" at the time of changing the size of the readout range, is also displayed by the character generator 30 under control by CPU 22.

According to the above described embodiment concerning the second feature of the present invention, when scrolling the contents of the displayed image in the display screen SC, such as the CRT monitor, the characters having positional pertinence to the contents of the display image, such as the pointer marks or trimming frames, are shifted simultaneously in the same direction by the same distance, so that the relative position of these characters with respect to the displayed image is not shifted.

The above scrolling may also be performed not only vertically but also horizontally if the memory capacity is increased further. If the pointer mark on the trimming frame is moved in synchronism with scrolling to reach the terminal end of the display screen SC, the pointer mark or the trimming frame may continue to be moved further. However, the pointer mark or the trimming frame may cease to be moved and only the contents of the displayed image may be scrolled, in order to prevent the pointer marks or the trimming frame from coming out of the range of the display screen SC and thus vanishing from sight. The legends concerning the functions of the above apparatus need not be synchronized with scrolling, but may be displayed stationarily at prescribed positions within the display screen SC.

Although various minor changes and modifications might be proposed by those skilled in the art, it will be understood that I wish to include within the claims of the patent warranted hereon all such changes and modifications as reasonably come within my contribution to the art.

What is claimed is:

1. An image reading apparatus, comprising:
   image read-out means for reading out image documents, and an image memory means for storing image data read out by said image read-out means;
   character generator means for generating characters in a form of indicators for indicating desired portions on said image documents;
   means for reading out image data from said image memory means and means for converting the read out image data to analog RGB image data;
   means for superimposing said characters output from said character generating means on said RGB analog image data read out from said image memory means, said superimposing means outputting superimposed signals as RGB signals;
   operation means for moving a displaying position of said characters from said character generating means with respect to the read out image data;
   means for continuously moving image data read out from said image memory means so as to create a scroll display, and means for moving a display position of said characters in the form of indicators relative to said image data read out from said image memory means so that the display position of the indicator character changes in dependence upon a scrolling movement of the image data and a relative position of the indicator character to specific image data being indicated remains constant;
   luminance matrix circuit means for converting said RGB signals into a luminance signal for a composite television signal;
   chrominance matrix circuit means for converting said RGB signals into a chrominance signal for the composite television signal; and
   mixer means for mixing the luminance signals and chrominance signals for creating said composite television signal.

2. An image reading apparatus according to claim 1 wherein said character generating means generates indicators in the form of a point marker means for pointing to any position of said document within a scanning area of said image read-out means.

3. An image reading apparatus according to claim 1 wherein said character generating means indicators comprise a trimming frame means for trimming a display image representing a portion of an area of said document scanned by said image read-out means.

4. An image reading apparatus according to claim 1 wherein said means for continuously moving image data to create a scroll display comprises means for moving an image data reading region in said image memory.

5. An image reading apparatus, comprising:
   image read-out means for reading out image documents, and an image memory means for storing image data read out by said image read-out means;
   character generator means for generating characters in a form of indicators for indicating desired portions on said image documents;
   means for reading out image data from said image memory means, means for converting the read out image data to analog RGB image data;
   means for superimposing said characters output from said character generating means on said RGB analog image data read out from said image memory means, said superimposing means outputting superimposed signals as RGB signals;
   operation means for moving a displaying position of said characters from said character generating means with respect to the read out image data;
   means for continuously moving image data read out from said image memory means so as to create a scroll display, and means for moving a display position of said characters in the form of indicators relative to said image data read out from said image memory means so that the display position of the indicator character changes in dependence upon a scrolling movement of the image data and a relative position of the indicator character to specific image data being indicated remains constant;
   display means having a display screen for displaying the superimposed RGB signals; and
   said character generator means including means for generating a display table containing said indicators, means for superimposing said display table on said display screen, and means for moving the display table on the display screen so that a position of said indicator for indicating desired portions on said image documents can be accomplished by either moving the indicator within the display table or moving the display table on the display screen.

6. An image reading apparatus comprising:
   reading head means for scanning a document so as to read an image of said document;
   A/D converter means for converting said image from analog data to digital data;
   an image memory means for storing said image of said document as said digital data;
   image read-out means for reading out said image of said document from said image memory means;
   character generating means for generating indicators in the form of a point marker;
   means for shifting an image data region stored in said image memory means for effecting scroll display controlled by said image read-out means;
   superimposition circuit means for superimposing character display signals output from said character generating means on image data read out from said image memory means, said superimposition circuit means outputting a displayed image made by superimposing said indicator in said image data;
   means for moving a display position of said character display signals in a controlled manner dependent on movement of the image data in a scroll display for coincidence of a position of a character display with respect to a displayed image and so that a relative position of the character display with respect to the displayed image remains constant;

said means for moving a display position being controlled by a key input device;

D/A converter means for converting said displaying image from digital data to analog data; and connector means for connecting a peripheral display apparatus so that said displayed image as said analog data from said D/A converter displays said image document with said indicator on said display apparatus.

* * * * *